United States Patent
Von Strandtmann et al.

[11] 3,887,584
[45] June 3, 1975

[54] 3-(HYDROXYMETHYL)CHROMONES

[75] Inventors: Maximilian Von Strandtmann, Rockaway; John Shavel, Jr., Mendham; Sylvester Klutchko, Hackettstown; Marvin Cohen, New Milford, all of N.J.

[73] Assignee: Warner-Lambert Company, Morris Plains, N.J.

[22] Filed: Dec. 26, 1973

[21] Appl. No.: 428,290

Related U.S. Application Data

[60] Division of Ser. No. 309,329, Nov. 30, 1972, Pat. No. 3,798,240, which is a continuation-in-part of Ser. No. 112,765, Feb. 4, 1971, abandoned.

[52] U.S. Cl............................. 260/345.2; 424/283
[51] Int. Cl............................................. C07d 7/34
[58] Field of Search................................ 260/345.2

[56] References Cited
UNITED STATES PATENTS
3,798,240  3/1974  von Strandtmann et al. ... 260/345.2

*Primary Examiner*—John M. Ford
*Attorney, Agent, or Firm*—Albert H. Graddis; Frank S. Chow; Anne M. Kelly

[57] ABSTRACT

The present invention relates to compounds of type I:

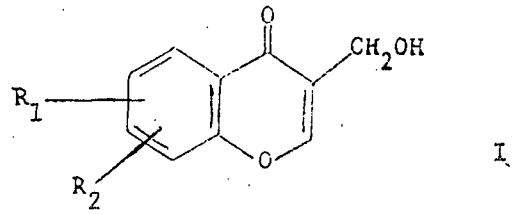

wherein $R_1$ and $R_2$ are hydrogen, halogen, alkyl, aralkyl, aryl, alkoxy, acylamino, hydroxy, or taken together $R_1$ and $R_2$ form an aromatic ring. These compounds are prepared from the corresponding o-hydroxy-ω-(methylsulfinyl)acetophenones. These compounds are useful in alleviating allergic manifestations.

10 Claims, No Drawings

3-(HYDROXYMETHYL)CHROMONES

This application is a division of U.S. application Ser. No. 309,329, filed Nov. 30, 1972, now U.S. Pat. No. 3,798,240, which, in turn, is a continuation-in-part of U.S. Ser. No. 112,765, filed Feb. 4, 1971, now abandoned.

The present invention relates to 3-(hydroxymethyl)-chromones having the following structural formula:

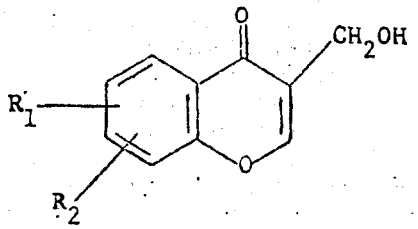

wherein $R_1$ and $R_2$ each represent hydrogen, halogen, alkyl, aralkyl, aryl, alkoxy, acylamino, hydroxy or, taken together, $R_1$ and $R_2$ form an aromatic ring.

The present invention also includes within its scope novel processes for the production of these 3-(hydroxymethyl)chromones.

As used throughout the specification and claims, the term "alkyl" and the "alkyl" portion of "alkoxy" embraces both straight and branched alkyl radicals containing from 1 to 8 carbon atoms; for example, methyl, ethyl, propyl, isopropyl, n-butyl, n-amyl, n-hexyl, 2-ethylbutyl, 2,3-dimethylbutyl and the like. The term "halogen" encompasses fluorine, bromine, chlorine and iodine. Ther term "aryl" denotes an aromatic hydrocarbon of 6 to 8 carbon atoms such as phenyl, tolyl and the like. The term "aralkyl" encompasses alkyl groups in which aryl as previously defined is substituted for a hydrogen atom, such as for example benzyl, phenethyl, and the like. The term "acyl" means radicals of those hydrocarbon carboxylic acids of less than 12 carbon atoms as exemplified by the lower alkanoic acid, e.g., acetic, propionic, butyric, the aryl carboxylic acid, e.g., benzoic and toluic acid and the like.

The compounds of this invention are active orally or by injection in preventing the allergic and asthmatic reactions in mammals such as cats, dogs, guinea pigs and the like. Thus, for example, in tests conducted according to the procedures described in *Life Sciences*, 7, 465 (1963), and in *Proc. Soc. Exptl. Biol. Med.*, 81, 584 (1952), the compounds of this invention when administered to the respective animals such as rats and guinea pigs at a dose of about 5 to 100 mg/kg are capable of alleviating allergic and asthamatic conditions in these animals.

The compounds of this invention are useful in providing symptomatic relief of allergic conditions such as asthma, hay fever and the like. Generally speaking, these compounds are administered orally, by injection or in the form of an aerosol spray at a dose of about 5 to 100 mg/kg.

In order to use these compounds they are formulated with known pharmaceutical diluents such as water, lactose, powdered sugar, mannitol and the like into dosage forms such as tablets, capsules, and the like.

According to the present invention, these compounds are prepared by a reaction as represented in the following scheme:

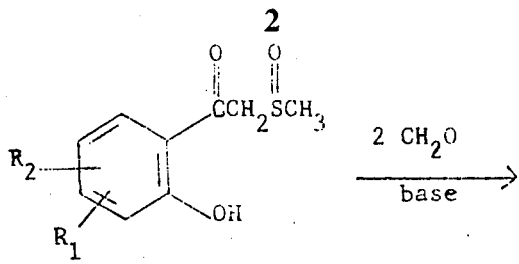

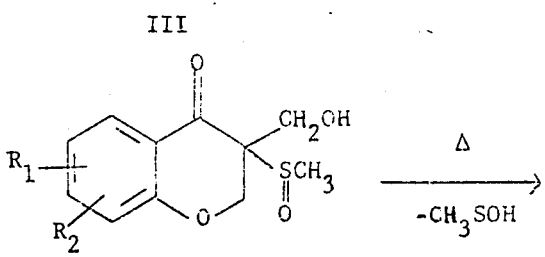

The desired compounds I are obtained from o-hydroxy-ω-(methylsulfinyl) acetophenones with or without isolation of the intermediate compounds II.

The starting compounds III are prepared by the reaction of salicylic esters with sodium methylsulfinyl carbanion generated by the action of sodium hydride on dimethyl sulfoxide. A similar preparation of compound III ($R_1$ and $R_2$ = H) has been reported. Becker, et al. JACS. 85: 3410 (1963).

In order to further illustrate the practice of the invention the following examples are included:

EXAMPLE 1

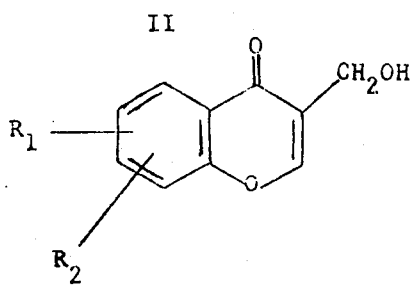

3-(hydroxymethyl)-3-(methylsulfinyl)-4-chromanone

A quantity of 24.3 g (0.3 mole) of 37% aqueous formaldehyde solution was added all at once to a stirred, warm (40°C) solution of 29.7 g (0.15 mole) of 2'-hydroxy-2-(methylsulfinyl) acetophenone, 90 g potassium carbonate and 600 ml of water. After 1 minute turbidity developed as an oil separated. The mixture was allowed to cool slowly over a period of one-half an hour. The oil was extracted into 5 liters of ether and the solution was dried ($K_2CO_3$), filtered and concentrated to give 25.0 g (69.4%) of a viscous oil $N_D{}^{26}$ 1.5868.

Anal. Calcd for $C_{11}H_{12}O_4S$: C, 54.99; H, 5.03; S, 13.34.

Found: C, 55.06; H, 5.15; S, 13.09.

EXAMPLE 7

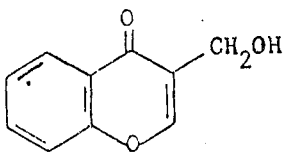

3-(hydroxymethyl)chromone

A solution of 14.0 g (0.058 mole) of 3-(hydroxymethyl)-3-(methylsulfinyl)-4-chromanone in 30 ml of toluene was refluxed vigorously for 10 minutes. The cooled solution yielded 5.1 g (49.5%) of pale yellow crystals, mp 108°–110°C. Pure material, mp 109°–111°C, was obtained by recrystallization from ethyl acetate-petroleum ether.

Anal. Calcd for $C_{10}H_8O_3$: C, 68.18; H, 4.58.
Found: C, 68.20; H, 4.68.

EXAMPLE 3

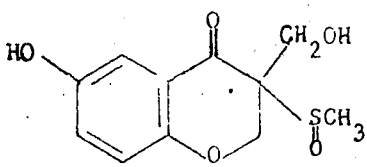

6-hydroxy-3-(hydroxymethyl)-3-(methylsulfinyl)-4-chromanone.

This compound was prepared by reacting 8.56 g of 2′,5′-dihydroxy-2-(methylsulfinyl)acetophenone with 20 ml of formalin in analogous fashion to 3-(hydroxymethyl)-3-(methylsulfinyl)-4-chromanone. The material was recrystallized from methanol, mp 156°–60° C; yield 1 g (10%).

Anal. Calcd for $C_{11}H_{12}O_5S$: C, 51.55; H, 4.72; S, 12.51.
Found: C, 51.73; H, 4.78; S, 12.30.

EXAMPLE 4

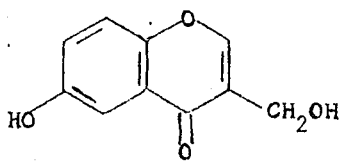

6-hydroxy-3-(hydroxymethyl)chromone.

This was prepared by boiling the 6-hydroxy-3-(hydroxymethyl)-3-(methylsulfinyl)-4-chromanone obtained from 10.56 g of 2′,5′-dihydroxy-2-(methylsulfinyl)acetophenone in 200 ml of xylene for 15 min. The mixture was chilled, the solid filtered off and recrystallized from $CH_3OH$, m.p. 215°–18.5°C; yield 0.5 g (5.2%).

Anal. Calcd for $C_{10}H_8O_4$: C, 62.50; H, 4.20.
Found: C, 62.48; H, 4.32.

EXAMPLE 5

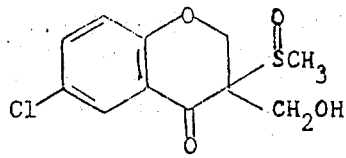

6-chloro-3-(hydroxymethyl)-3-(methylsulfinyl)-4-chromanone

To a solution of 2 g of $K_2CO_3$ in 10 ml of $H_2O$ is added 0.7 g of 5′-chloro-2′-hydroxy-2-(methylsulfinyl) acetophenone. The resulting solution is then treated with stirring with 1.7 ml of formalin. On continued stirring a cloudy precipitate formed which solidified. The solid is filtered, washed $H_2O$, and recrystallized from acetone, mp 133.5°–35.5°; yield 200 mg (24%).

Anal. Calcd for $C_{11}H_{11}ClO_4S$: C, 48.09; H, 4.04; S, 11.67.
Found: C, 48.28; H, 4.02; S, 11.79.

EXAMPLE 6

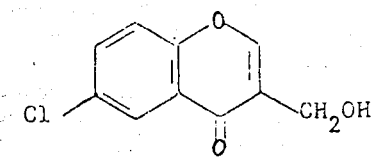

6-chloro-3-(hydroxymethyl)chromone.

To a solution of 40 g of $K_2CO_3$ in 200 ml of $H_2O$ was added with stirring 14 g of 5′-chloro-2′-hydroxy-2-(methylsulfinyl) acetophenone. The yellow solution that formed was then treated with stirring with 34 ml of formalin. On further stirring an oil precipitated which solidified. The mixture was chilled, and the precipitate was filtered off and washed with cold $H_2O$. The precipitate was suspended in 300 ml of xylene and the mixture boiled for ½ hour with charcoal. The mixture was filtered hot and on cooling crystals formed in the filtrate. These crystals were filtered off and recrystallized from absolute ethanol, mp 163°–64°; yield 6 g (49%).

Anal. Calcd for $C_{10}H_7ClO_3$: C, 57.03; H, 3.35.
Found: C, 57.00; H, 3.23.

EXAMPLE 7

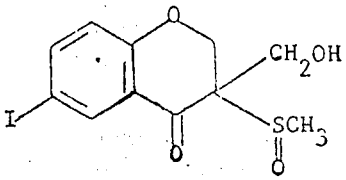

3-(hydroxymethyl)-6-iodo-3-(methylsulfinyl)-4-chromanone

To a solution of 20 g of $K_2CO_3$ in 100 ml of $H_2O$ was added 9.75 g of 2′-hydroxy-5′-iodo-2-(methylsulfinyl) acetophenone. The resulting solution was treated with 17 ml of formalin and after 15 mins. stirring the solid that precipitated was filtered, washed with cold $H_2O$, and recrystallized from acetone, mp 122°-24°; yield 4 g (36%).

Anal. Calcd for $C_{11}H_{11}IO_4S$: C, 36.08; H, 3.03; S, 8.76.
Found: C, 36.30; H, 3.01; S, 8.86.

EXAMPLE 8

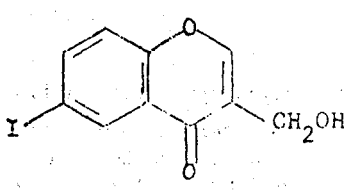

3-(hydroxymethyl)-6-iodochromone.

This was prepared by reacting a solution of 20 g of 2'-hydroxy-5'-iodo-2-(methylsulfinyl)acetophenone in 200 ml of $H_2O$ containing 40 g of $K_2CO_3$ with 34 ml of formalin in analogous fashion to 6-chloro-3-(hydroxymethyl)chromone. The material was recrystallized from absolute ethanol, mp 134°-37°; yield 5 g (27.5%).

Anal. Calcd for $C_{10}H_7IO_3$: C, 39.76; H, 2.34.
Found: C, 39.88; H, 2.40.

EXAMPLE 9

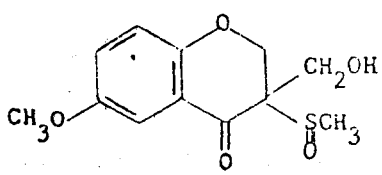

3-(Hydroxymethyl)-6-methoxy-3-(methylsulfinyl)-4-chromanone.

This was prepared by reacting a solution of 14 g of 2'-hydroxy-5'-methocy-2-(methylsulfinyl)acetophenone in 200 ml of $H_2O$ containing 40 g of $K_2CO_3$ with 34 ml of formalin in analogous fashion to 6-chloro-3-(hydroxymethyl)-3-(methylsulfinyl)chromanone. The material was recrystallized from acetone, mp 107°-110° C.; yield 4 g (25%).

Anal. Calcd for $C_{12}H_{14}O_5S$: C, 53.32; H, 5.22; S, 11.86.
Found: C, 53.53; H, 5.22; S, 11.78.

EXAMPLE 10

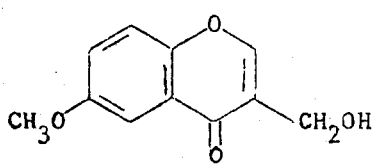

3-(hydroxymethyl)-6-methoxychromone.

This material was prepared by reacting a solution of 7 g of 2'-hydroxy-5'-methoxy-2-(methylsulfinyl)-acetophenone in 100 ml of $H_2O$ containing 20 g of $K_2CO_3$ with 17 ml of formalin in analogous fashion to 6-chloro-3-(hydroxymethyl) chromone. The material was recrystallized from absolute ethanol, mp 150°-53.5°; yield 3.5 g (56%).

Anal. Calcd for $C_{11}H_{10}O_4$: C, 64.07; H, 4.89.
Found: C, 64.21; H, 4.86.

EXAMPLE 11

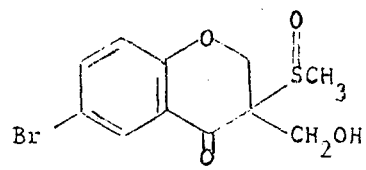

6-bromo-3-(hydroxymethyl)-3-(methylsulfinyl)-4-chromanone.

To a solution of 40 g of $K_2CO_3$ in 200 ml of $H_2O$ is added with stirring 16.6 g of 5'-bromo-2'-hydroxy-2-(methylsulfinyl) acetophenone. The resulting solution is then treated with 34 g of formalin. After 15 mins. stirring, the solution becomes cloudy and an oil precipitates. On further stirring the oil solidified. The mixture is chilled, the precipitate filtered, washed with cold $H_2O$, and recrystallized from acetone, mp 129°-31°; yield 5g (26%).

Anal. Calcd for $C_{11}H_{11}BrO_4S$: C, 41.39; H, 3.47; S, 10.05.
Found: C, 41.73; H, 3.43; S, 10.18.

EXAMPLE 12

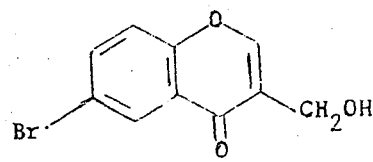

6-bromo-3-(hydroxymethyl)chromone.

To a solution of 15.6 g of $K_2CO_3$ in 78 ml of $H_2O$ is added 6.5 g of 4'-bromo-2'-hydroxy-2-(methylsulfinyl) acetophenone. The resulting solution was then treated with stirring with 13.3 g of formalin. After several minutes of stirring, an oil precipitated which solidified on continued stirring. The mixture is chilled and the precipitate filtered and washed with cold $H_2O$. The precipitate was then suspended in 50 ml of xylene and the mixture boiled for ½ hr. The resulting solution was cooled and the crystals that formed were filtered and recrystallized from absolute ethanol with the aid of charcoal, mp 154°-58°; yield 1 g (17%).

Anal. Calcd for $C_{10}H_7BrO_3$: C, 47.09; H, 2.77.
Found: C, 47.29; H, 2.81.

EXAMPLE 13

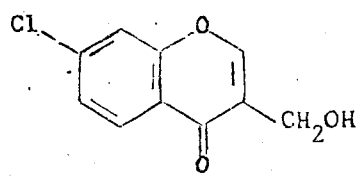

7-chloro-3-(hydroxymethyl)chromone.

This material was prepared by reacting a solution of 14 g of 4'-chloro-2'-hydroxy-2-(methylsulfinyl) acetophenone in 200 ml of $H_2O$ containing 40 g of $K_2CO_3$ in analogous fashion to 6-chloro-3-(hydroxymethyl)chromone. The material was recrystallized from absolute ethanol, mp 157°–59°; yield 6 g (47%).

Anal. Calcd for $C_{10}H_7ClO_3$: C, 57.03; H, 3.35. Found: C, 57.06; H, 3.32.

EXAMPLE 14

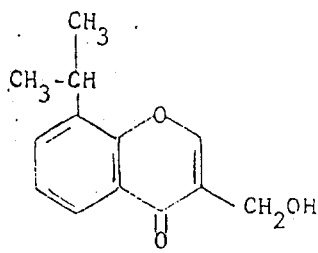

3-(hydroxymethyl)-8-isopropylchromone..

To a solution of 28 g of $K_2CO_3$ in 140 ml of $H_2O$ was added 10 g of 2'-hydroxy-3'-isopropyl-2-(methylsulfinyl)acetophenone. The resulting suspension was then treated with stirring with 25 g of formalin. A clear solution formed which on further stirring becomes cloudy and an oil precipitated out. The mixture was extracted 4 times with 25 ml portions of $CH_2Cl_2$, and the combined $CH_2Cl_2$ extracts were dried over $Na_2SO_4$, and taken down to a gum under reduced pressure. The gum was taken up in 50 ml of toluene and the solution boiled for ½ hour. On cooling, crystals formed. The crystals were filtered and recrystallized from toluene, mp 121°–23°; yield 4 g (44%).

Anal. Calcd for $C_{13}H_{14}O_3$: C, 71.54; H, 6.47. Found: C, 71.71; H, 6.46.

EXAMPLE 15

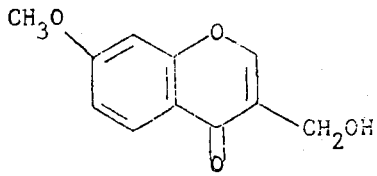

3-(hydroxymethyl)-7-methoxychromone.

This was prepared by reacting 2 g of 2'-hydroxy-6'-methoxy-2-(methylsulfinyl)acetophenone with 5.1 ml of formalin in analogous fashion to the preparation of 3-(hydroxymethyl)-8-isopropylchromone. The material was recrystallized from absolute ethanol, m.p. 117.5°–18.5° C.; yield 0.5 g (29%).

Anal. Calcd for $C_{11}H_{10}O_4$: C, 64.07; H, 4.89. Found: C, 64.28; H, 4.79.

EXAMPLE 16

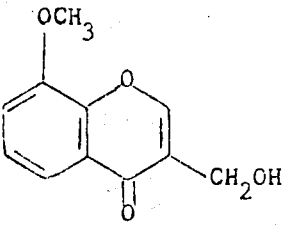

3-(hydroxymethyl)-8-methoxychromone.

This material was prepared by reacting a solution of 13.5 g of 2'-hydroxy-3'-methoxy-2-(methylsulfinyl)-acetophenone in 20 ml of $H_2O$ containing 40 g of $K_2CO_3$ with 35 ml of formalin in an analogous fashion to 3-(hydroxymethyl)-8-isopropyl chromone. The material was recrystallized from absolute ethanol, mp 166°–68°; yield 6 g (50%).

Anal. Calcd for $C_{11}H_{10}O_4$: C, 64.07; H, 4.89. Found: C, 68.88; H, 4.97.

EXAMPLE 17

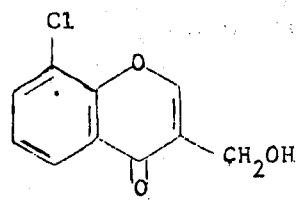

8-chloro-3-(hydroxymethyl)chromone.

This was prepared by reacting a solution of 14 g of 3'-chloro-2'-hydroxy-2-(methylsulfinyl)acetophenone in 200 ml of $H_2O$ containing 40 g of $K_2CO_3$ with 34 ml of formalin in an analogous fashion to 3-hydroxymethyl)-8-isopropylchromone. The material was recrystallized from absolute ethanol, m.p. 158°–62°; yield 6 g (47%).

Anal. Calcd for $C_{10}H_7C/O_3$: C, 57.03; H, 3.35. Found: C, 57.18; H, 3.34.

EXAMPLE 18

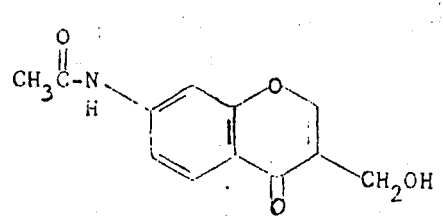

7-acetamido-3-(hydroxymethyl)chromone.

To a solution of 23.5 g of $K_2CO_3$ in 120 ml of $H_2O$ is added 9 g of 4'-acetamido-2'-hydroxy-2-(methylsulfinyl)acetophenone. The solution is then treated with 20 ml of formalin and after about 15 mins. stirring, the crystalline precipitate that forms is filtered, washed with cold $H_2O$, and recrystallized from acetone. The crystalline product is taken up in 20 ml of dimethyl formamide and the solution boiled for 15 min. The solution is diluted to 125 ml with CH₃CN, and on chilling crystals deposited. The crystals are filtered and recrystallized from CH₃CH, mp 254°–58°; yield, 1 g (12%).

Anal. Calcd for C₁₂H₁₁NO₄: C, 61.80; H, 4.75; N, 6.01.
Found: C, 61.97; H, 4.80; N, 6.02.

EXAMPLE 19

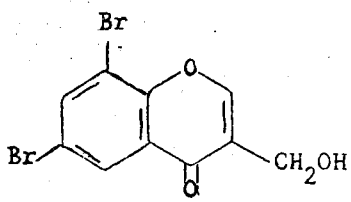

6,8-dibromo-3-(hudroxymethyl)chromone.

To a solution of 8 g of K₂CO₃ in 40 ml of H₂O is added 4.2 g of 3′,5′-dibromo-2′-hydroxy-2-(methylsulfinyl)acetophenone. The solution is then treated with 6.8 ml of formalin and stirred for 15 min. A gum precipitates. The supernatant liquid is decanted, and the gum washed with cold H₂O by decantation and then triturated with cold CH₃OH, causing it to solidify. The solid is filtered, washed with cold CH₃OH, and suspended in 20 ml of toluene. This is boiled for 15 min. The resulting solution is cooled and the crystalline precipitate is filtered off, washed with cold toluene, and recrystallized from absolute ethanol, mp 166°–69°; yield 0.5 g (12.5%).

Anal. Calcd for C₁₀H₆Br₂O₃: C, 35.96; H, 1.81.
Found: C, 35.98; H, 1.87.

EXAMPLE 20

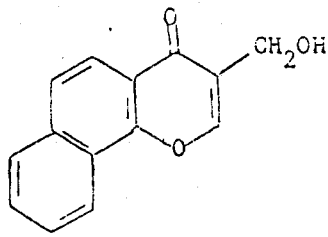

3-(hydroxymethyl)benzo[h]chromone

A mixture of 2.0 g (0.0081 mole) of 1′-hydroxy-2-(methylsulfinyl)-2′-acetonaphthone, 2.63g(0.032 mole) of 37% aqueous formaldehyde, 20 ml of methanol and 10 g potassium carbonate was warmed to 50° for 5 minutes. Water (50 ml) was added and the reaction was again warmed at 50° for 5 minutes. Additional potassium carbonate was added to "salt out" organic layer. Some of the methanol was stripped off and the mixture was extracted with 30 ml toluene and 100 ml of methylene chloride. The solution was dried over potassium carbonate, filtered and stripped of methylene chloride. The remaining toluene solution was refluxed for one half hour. On cooling, yellow crystals separated. Wt. 0.5 g (27%) mp 162°–4°C. Recrystallization from ethyl acetate gave pure material, mp 163°–5°C.

Anal. Calcd for C₁₄H₁₀O₃: C, 74.33; H, 4.46.
Found: C, 74.42; H, 4.49.

EXAMPLE 21

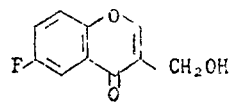

6-Fluoro-3-(hydroxymethyl)chromone.

This compound was prepared by allowing to react a solution of 13 g. of 5′-fluoro-2′-(methylsulfinyl)acetophenone in 400 ml. of H₂O and 40 g. of K₂CO₃ with 34 ml. of formalin in analogous fashion to 6-bromo-3-(hydroxymethyl)chromone. The material was recrystallized from abs. ethanol; m.p. 153°–156°; yield 3.5 g. (30%).

Anal. Calcd for C₁₀H₇FO₃: C, 61.86; H, 3.63.
Found: C, 61.63; H, 3.61.

EXAMPLE 22

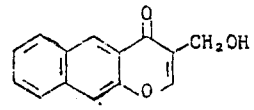

3-(Hydroxymethyl)-4-naphtho[2,3-b]pyran-4-one.

A solution of 20.0 g. (0.081 mole) of 3′-hydroxy-2-(methylsulfinyl)-2′-acetonaphthone, 400 ml of methanol, 19.71 g. (0.24 mole) of 37% formaldehyde and 20 drops of piperidine was maintained at reflux for 15 minutes and concentrated. Toluene (300 ml.) was added to the residue and the mixture was heated to reflux. The resulting solution was decanted from a small amount of undissolved material and reheated to reflux for ½ hr. Crystals separated from the cooled solution; wt, 5.4 g. (30%); m.p. 165°–168°. Recrystallization from toluene gave pure, orange crystals; m.p. 174°–176°.

Anal. Calcd. for C₁₄H₁₀O₃: C, 74.33; H, 4.46.
Found: C, 74.52; H, 4.60.

EXAMPLE 23

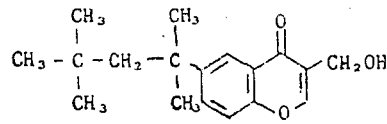

3-(Hydroxymethyl)-6-(1,1,3,3-tetramethylbutyl)chromone.

To a solution of 20 g. of K₂CO₃ in 200 ml. of H₂O was added 9 g. of 2′-hydroxy-2-(methylsulfinyl)-5′-(1,1,3,3-tetramethylbutyl)acetophenone with stirring. The mixture was treated with 25 ml. of methanol followed by 17 ml. of formalin. After 10 min. of stirring, an oil precipitated out. The mixture was extracted 3 times with 50 ml. portions of CH₂Cl₂. Combined extracts were dried over Na₂SO₄, and concentrated to a gum under reduced pressure. The gum was taken up in 100 ml. of xylene, and the solution was boiled for 15 min. The xylene solution was evaporated at reduced pressure and the mixture was recrystallized from Skelly B. m.p. 99°–101°; yield 2.5 g. (14.5%).

Anal. Calcd. for $C_{18}H_{24}O_3$: C, 74.97; H, 8.39. Found: C, 75.26; H, 8.57.

EXAMPLE 24

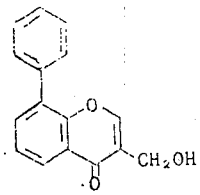

3-(Hydroxymethyl)-8-phenylchromone.

To a solution of 40 g. of $K_2CO_3$ in 400 ml. of $H_2O$ was added 16.46 g. of 2'-hydroxy-2-(methylsulfinyl)-3'-phenylacetophenone. The stirred suspension was treated with 34 ml. of formalin, and a clear solution formed. After 10 min. a gum started to come out of solution. The mixture was stirred for an additional 15 min. and extracted 5 times with 100 ml. portions of $CH_2Cl_2$. Combined extracts were dried over $Na_2SO_4$, and evaporated to a solid residue under reduced pressure. The residue was taken up in 100 ml. of toluene, and the mixture boiled for 30 min. The resulting solution was chilled, and the crystalline precipitate that formed was filtered off, and recrystallized from benzene; m.p. 105°–107°; yield 4 g. (27%).

Anal. Calcd. for $C_{12}H_{16}O_3$: C, 76.18; H, 4.79. Found: C, 76.07; H, 4.83.

EXAMPLE 25

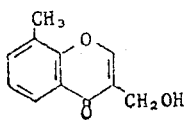

3-(Hydroxymethyl)-8-methylchromone.

To a solution of 60 g. of $K_2CO_3$ in 600 ml. of $H_2O$ was added with stirring 19.2 g. of 2'-hydroxy-3-methyl-2-(methylsulfinyl)acetophenone. The yellow suspension was treated with 51 ml. of formalin, and a clear solution was obtained. After 15 minutes of stirring an oil separated out. The mixture was extracted 3 times with 100 ml. portions of $CH_2Cl_2$. Combined $CH_2Cl_2$ extracts were dried over $Na_2SO_4$ and evaporated to an oil under reduced pressure. The oil was taken up in 250 ml. of toluene, and the mixture boiled for ½ hr. The resulting solution was chilled and the crystals that formed filtered off and recrystallized for absolute ethanol; m.p. 142°–144°; yield 9.5 g. (53%).

Anal. Calcd. for $C_{11}H_{10}O_3$: C, 69.56; H, 5.30. Found: C 69.56; H, 5.49.

EXAMPLE 26

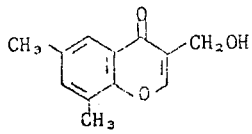

3-(Hydroxymethyl)-6,8-dimethylchromone.

To a solution of 60 g. of $K_2CO_3$ in 600 ml. of $H_2O$ was added with stirring 20.75 g. of 2'-hydroxy-3',5'-dimethyl-2-(methylsulfinyl)acetophenone. The suspension was treated with 51 ml. of formalin, and a clear solution was obtained. After 10 min. stirring an oil separated out which solidified. The mixture was chilled, and the solid filtered, washed with cold $H_2O$, and suspended in 375 ml. of toluene. The mixture was boiled for 30 min. and the resulting solution chilled. A crystalline precipitate formed. This was filtered, and recrystallized from $CH_3CN$; m.p. 180.5°–183°; yield 11.5 g. (63%).

Anal. Calcd. for $C_{12}H_{12}O_3$: C, 70.57; H, 5.92. Found: C, 70.40, H, 6.07.

EXAMPLE 27

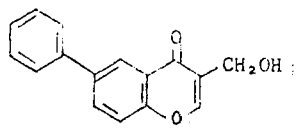

3-(Hydroxymethyl)-6-phenylchromone.

To a solution of 40 g. of $K_2CO_3$ in 400 ml. of $H_2O$ was added 16.4 g. of 2'-hydroxy-2-(methylsulfinyl)-5'-phenylacetophenone. The resulting yellow solution was treated with 64 ml. of formalin with stirring. After 10 min. a heavy oil deposited. The mixture was extracted 3 times with 100 ml. portions of $CHCl_3$. Combined extracts were dried over $Na_2SO_4$, and concentrated to an oil under reduced pressure. The oil was taken up in 200 ml. of toluene, and the solution boiled for 30 min. On cooling crystals deposited. The crystals were filtered, and recrystallized from benzene, m.p. 130.5°–132°; yield 5 g. (33%).

Anal. Calcd. for $C_{16}H_{12}O_3$: C, 76.19; H, 4.80. Found: C, 76.03; H, 4.93.

EXAMPLE 28

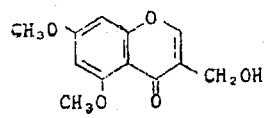

3-(Hydroxymethyl)-5,7-dimethoxychromone.

This compound was prepared by allowing to react a solution of 15.5 g. of 4',6'-dimethoxy-2'-hydroxy-2-(methylsulfinyl)acetophenone in 400 ml. of $H_2O$ and 40 g. of $K_2CO_3$ with 34 ml. of formalin in analogous fashion to 6-bromo-3-(hydroxymethyl)chromone. The compound was recrystallized from $CH_3CN$, m.p. 150–153.5°; yield 4.5 g. (32%).

Anal. Calcd. for $C_{12}H_{12}O_5$: C, 61.01; H, 5.12. Found: C, 60.93; H, 5.12.

EXAMPLE 29

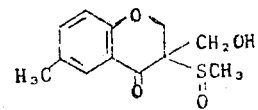

3-(Hydroxymethyl)-6-methyl-3-(methylsulfinyl)-4-chromanone.

A solution of 40 g. $K_2CO_3$ in 400 ml. of $H_2O$ was added with stirring 12.7 g. of 2'-hyydroxy-5'-methyl-2-(methylsulfinyl)acetophenone. The resulting solution was treated with 34 ml. of formalin, and stirred for 30 min. A precipitate deposited. The mixture was chilled, and the precipitate filtered off, washed with cold $H_2O$, and recrystallized from acetone; m.p. 125°–126°; yield 5 g. (33%).

Anal. Calcd. for $C_{12}H_{14}SO_4$: C; 56.68; H, 5.55; S, 12.61.
Found: C, 56.65; H, 5.55; S, 12.81.

EXAMPLE 30

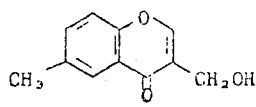

3-(Hydroxymethyl)-6-methylchromone.

This compound was prepared by allowing to react a solution of 12.72 g. of 2'-hydroxy-5'-methyl-2-(methylsulfinyl)acetophenone in 400 ml. of $H_2O$ and 40 g. of $K_2CO_3$ with 34 ml. of formalin in analogous fashion to 6-bromo-3-(hydroxymethyl)chromone. The material was recrystallized from methanol, m.p. 143°–147°; yield 4.5 g. (39%).

Anal. Calcd. for $C_{11}H_{10}O_3$: C, 69.46; H, 5.30.
Found: C, 69.21; H, 5.30.

EXAMPLE 31

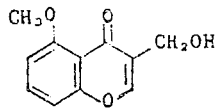

3-(Hydroxymethyl)-5-methoxychromone.

To a solution of 14 g. of 2'-hydroxy-6'-methoxy-2-(methylsulfinyl)acetophenone in 200 ml. of $H_2O$ containing 40 g. of $K_2CO_3$ was added 34 ml. of formalin, and the solution stirred for 10 min. An oil separated out, and the mixture was extracted 3 times with 50 ml. portions of $CH_2Cl_2$. Combined extracts were dried over $Na_2SO_4$ and concentrated to an oil under reduced pressure. The oil was taken up in 250 ml. of toluene, and the mixture boiled for 30 min. On cooling, crystals formed. These were filtered and recrystallized from ethylacetate; m.p. 155°–156°; yield 3 g. (25%).

Anal. Calcd. for $C_{11}H_{10}O_4$: C, 64.07; H, 4.89.
Found: C, 63.81; H, 4.94.

EXAMPLE 32

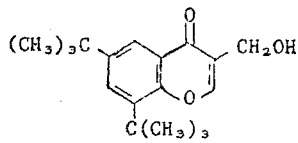

6,8-di-tert-butyl-3-(hydroxymethyl)chromone.

To a solution of 40 g. of $K_2CO_3$ in 300 ml. of $H_2O$ was added with stirring 18.6 g. of 3',5'-ditertbutyl-2'-hydroxy-2-(methylsulfinyl)acetophenone. The resulting suspension was treated with 64 ml. of formalin which resulted in an almost clear solution. After 15 min. of stirring, an oil separated out. The mixture was extracted 3 times with 100 ml. portions of $CHCl_3$. Combined extracts were dried over $Na_2SO_4$ and concentrated to an oil under reduced pressure. The oil was taken up in 125 ml. of toluene, and the mixture boiled for 30 min. On coolinig, crystals formed. The crystals were filtered off, and recrystallized from ethylacetate; m.p. 156°–158°; yield 5 g. (29%).

Anal. Calcd. for $C_{18}H_{24}O_3$: C, 74.97; H, 8.39.
Found: C, 74.68; H, 8.54.

We claim:
1. A compound of the formula:

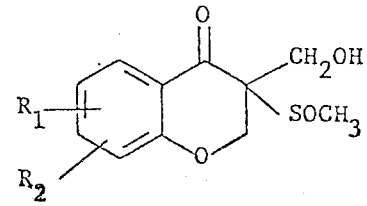

wherein $R_1$ and $R_2$ are each a member selected from a group consisting of hydrogen, lower alkyl of 1 to 6 carbon atoms, halogen, carbocylic aryl of 6 to 8 carbon atoms, aryl lower alkyl in which aryl and lower alkyl are as defined, alkoxy of 1 to 6 carbon atoms, hydroxy, acylamino in which acyl is alkanoyl of less than 12 carbon atoms, and $R_1$ and $R_2$, when attached to adjacent carbon atoms, together form an orthofused arylene ring in which aryl is as defined.

2. A compound according to claim 1 which is 3-(hydroxymethyl)-3-(methylsulfinyl)-4-chromanone.

3. A compound according to claim 1 which is 6-hydroxy-3-(hydroxymethyl)-3-(methylsulfinyl)-4-chromanone.

4. A compound according to claim 1 which is 6-chloro-3-(hydroxymethyl)-3-(methylsulfinyl)-4-chromanone.

5. A compound according to claim 1 which is 3-(hydroxymethyl)-6-iodo-3-(methylsulfinyl)-4-chromanone.

6. A compound according to claim 1 which is 3-(hydroxymethyl)-6-methoxy-3-(methylsulfinyl)-4-chromanone.

7. A compound according to claim 1 which is 6-bromo-3-(hydroxymethyl)-3-(methylsulfinyl)-4-chromanone.

8. A compound according to claim 1 which is 3-(hydroxymethyl)-6-methyl-3-(methylsulfinyl)-4-chromanone.

9. A compound according to claim 1 which is 2,3-dihydro-3-(hydroxymethyl)-3-(methylsulfinyl)-4H-naphtho[1,2-b]pyran-4-one.

10. A compound according to claim 1 which is 2,3-dihydro-3-(hydroxymethyl)-3-(methylsulfinyl)-4H-naphtho[2,3-b]pyran-4-one.

* * * * *